United States Patent
Yang et al.

(10) Patent No.: US 11,584,671 B1
(45) Date of Patent: Feb. 21, 2023

(54) MODIFIED HYDROXYETHYL CELLULOSE SCALE INHIBITOR FOR INHIBITING SILICA SCALE AND PREPARATION METHOD THEREOF

(71) Applicant: NANJING UNIVERSITY, Nanjing (CN)

(72) Inventors: Hu Yang, Nanjing (CN); Wei Chen, Quanzhou (CN); Pan Hu, Xiangtan (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/871,872

(22) Filed: Jul. 22, 2022

(30) Foreign Application Priority Data

Oct. 22, 2021 (CN) .......................... 202111232363.4

(51) Int. Cl.
| | |
|---|---|
| *C02F 5/12* | (2006.01) |
| *C08F 251/02* | (2006.01) |
| *C02F 1/44* | (2006.01) |
| *C02F 103/02* | (2006.01) |
| *B01D 65/08* | (2006.01) |

(52) U.S. Cl.
CPC .............. *C02F 5/12* (2013.01); *C08F 251/02* (2013.01); *B01D 65/08* (2013.01); *C02F 1/441* (2013.01); *C02F 2103/023* (2013.01)

(58) Field of Classification Search
None
See application file for complete search history.

(56) References Cited

FOREIGN PATENT DOCUMENTS

WO    WO-2008140729 A1 * 11/2008 ................ C02F 5/10

OTHER PUBLICATIONS

CNIPA, Notification of a First Office Action for CN202111232363. 4, dated Apr. 19, 2022.
Nanjing University (Applicant) et al., Reply to Notification of a First Office Action for CN202111232363.4, dated Apr. 27, 2022.
CNIPA, Notification to grant patent right for invention in CN202111232363.4, dated May 12, 2022.

* cited by examiner

*Primary Examiner* — Clare M Perrin
(74) *Attorney, Agent, or Firm* — Hemisphere Law, PLLC; Zhigang Ma

(57) ABSTRACT

A preparation method and use of a modified hydroxyethyl cellulose scale inhibitor for inhibiting silica scale are provided. The scale inhibitor is prepared by grafting reaction with hydroxyethyl cellulose as a raw material, ammonium persulfate as an initiator and N-(3-dimethylaminopropyl) methyl acrylamide as a graft monomer. The grafting reaction can introduce grafting chains containing amide group and tertiary amine group into a cellulose molecular chain, so that it can effectively disperse scale forming substances and obtain the efficient environment-friendly scale inhibitor. The scale inhibitor can effectively inhibit the generation of silica scale and prevent the increase of scale particle size, the scale inhibitor is used in a reverse osmosis system, which can effectively alleviate the decline of the membrane flux. The scale inhibitor has a good application prospect in controlling the silica scale on the surface of the reverse osmosis membrane.

4 Claims, 2 Drawing Sheets

MODIFIED HYDROXYETHYL CELLULOSE SCALE INHIBITOR FOR INHIBITING SILICA SCALE AND PREPARATION METHOD THEREOF

TECHNICAL FIELD

The disclosure relates to the field of water environment treatments, particular to a modified hydroxyethyl cellulose scale inhibitor for inhibiting silica scale and a preparation method thereof.

BACKGROUND

Fresh water is an indispensable resource in production and life. However, the increasing scale of industrial and urban water use in recent years has led to the shortage of fresh water resources, and the traditional water-saving technology is also difficult to meet the water demand. Desalination of seawater and brackish water has become one of the important sources of the fresh water. Among the existing desalination technologies, the reverse osmosis has become one of the main technologies in the market because of its advantages of low energy consumption and high efficiency. However, in the process of reverse osmosis desalination, the scaling of inorganic salts will inevitably occur, mainly including alkaline earth metal insoluble salts (such as calcium carbonate, calcium sulfate, etc.) and silicon dioxide (also referred to as silica). The generation of scaling problems will lead to the increase of transmembrane pressure and the decrease of membrane flux, and ultimately reduce the water production efficiency and increase the operation and maintenance cost. A scale inhibitor has the advantages of simple operation and low cost, so it is widely used in reverse osmosis desalination systems. According to there chemical compositions, the scale inhibitors can generally be divided into phosphorus scale inhibitors, synthetic polymeric scale inhibitors and environment-friendly scale inhibitors. The use of the phosphorus scale inhibitor will cause a large amount of phosphorus to enter the water, which may induce eutrophication of the water. Besides, the synthetic polymeric scale inhibitor is difficult to degrade after use. In recent years, with the increasing attention to environmental issues, non-phosphorus, environmentally friendly, biodegradable, and low-cost scale inhibitors are one of the hot topics in the research and development of scale inhibitors. In addition, due to the widespread of silicon dioxide in natural water, it is easy to scale and difficult to clean after the water recovery is improved, and different from the scale based on alkaline earth metal ions, silica scale can form amorphous scale through self-polymerization without obvious crystal structure. Therefore, the above-mentioned traditional scale inhibitors are difficult to inhibit the silica scale, so it is necessary to develop specific scale inhibitors that can effectively delay the polymerization of silicon dioxide or disperse silicon dioxide colloidal particles to inhibit the silica scale.

In recent years, natural polymers have attracted extensive attention because of their low cost and environmental friendliness. Common natural polymers, such as lignin, starch, and cellulose, among which the cellulose is the most abundant natural polymer material on the earth, with a wide range of sources and low prices. Therefore, it is of great practical significance to vigorously develop natural polymer modified scale inhibitors, especially cellulose modified water treatment agents. However, these natural polymers, including cellulose, have poor scale inhibition performance, which is mainly due to their poor water solubility and the lack of functional groups with scale inhibition in the polymer chains. They cannot be directly used as scale inhibitors. Different physical and chemical modification methods, such as graft copolymerization and etherification, are needed to introduce scale inhibition functional groups to make it have good scale inhibition performance. For silica scale, most of its surfaces are positively charged, which is different from alkaline earth metal salt scale. The surface of silica scale is negatively charged. Therefore, introducing an appropriate amount of cationic groups into natural polymer chains is conducive to improving its affinity and dispersion with silicon dioxide, which can further effectively inhibit the formation of silica scale.

In addition, among the different chemical modification methods, graft copolymerization is a common polymer chemical modification method. It can introduce various functional groups into polymer chains and construct a unique branched chain structure, which can make the polymer have the advantages of both raw material main chain and grafted side chain functional groups, and effectively improve its application performance.

SUMMARY

The purposes of the disclosure are to provide a green and efficient modified hydroxyethyl cellulose scale inhibitor for inhibiting the silica scale and a preparation method thereof. The modified hydroxyethyl cellulose scale inhibitor can effectively delay the polymerization of silicon dioxide and inhibit the generation of silica scale. Using hydroxyethyl cellulose, a commercially available cellulose derivative with good water solubility, as the raw material, the amino group with good affinity for silicon dioxide is introduced into the cellulose molecular chain by graft copolymerization to prepare the modified hydroxyethyl cellulose scale inhibitor with good scale inhibition effect on silica scale, which can effectively inhibit the scale formation of silicon dioxide. At the same time, the scale inhibitor is green, environmentally friendly and easy to biodegrade, and the price is low.

In order to solve the technical problem of the disclosure, the technical scheme is proposed as follows: a use of a modified hydroxyethyl cellulose scale inhibitor in green and efficient inhibiting silica scale, the modified hydroxyethyl cellulose scale inhibitor is used to inhibit the silica scale in one of a cooling water and a reverse osmosis system within 5 mg·L$^{-1}$ to 500 mg·L$^{-1}$, the modified hydroxyethyl cellulose scale inhibitor is obtained by graft copolymerization of hydroxyethyl cellulose in nitrogen atmosphere, and a structural formula of the modified hydroxyethyl cellulose scale inhibitor is shown as following Chemical Formula I:

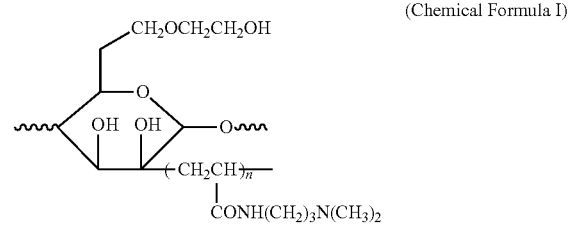

(Chemical Formula I)

where n is in a range of 0.04 to 2.00.

In an embodiment, the modified hydroxyethyl cellulose scale inhibitor is a grafted hydroxyethyl cellulose obtained by a reaction of the hydroxyethyl cellulose and N-(3-dimethylaminopropyl) methyl acrylamide.

In an embodiment, the hydroxyethyl cellulose modified scale inhibitor is obtained by the graft copolymerization with the hydroxyethyl cellulose as a raw material, ammonium persulfate as an initiator and N-(3-dimethylaminopropyl) methyl acrylamide as a graft monomer, a preparation method of the hydroxyethyl cellulose modified scale inhibitor is shown in Reaction Formula I:

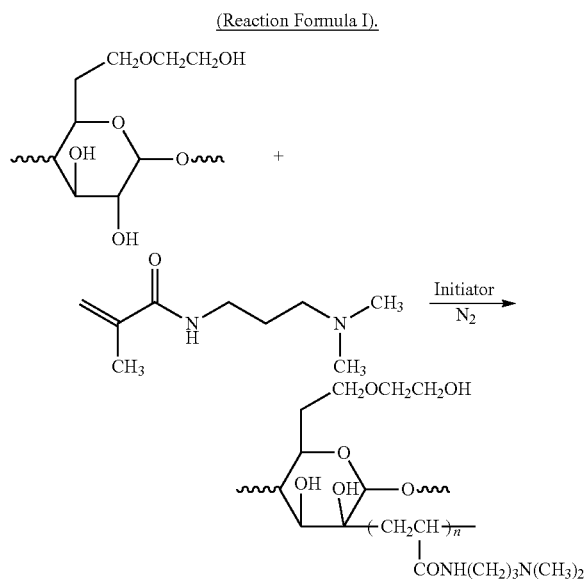

In an embodiment, the hydroxyethyl cellulose modified scale inhibitor is a grafted carboxymethyl cellulose obtained by a preparation method including: dissolving the hydroxyethyl cellulose in water to prepare a solution with a mass percentage concentration of 1% to 10% of the hydroxyethyl cellulose; adding the ammonium persulfate into the solution as the initiator, an addition amount being that a mole number of the initiator is 1% to 5% of a mole number of the hydroxyethyl cellulose; adding the N-(3-dimethylaminopropyl) methyl acrylamide with a mass ratio to the hydroxyethyl cellulose being 0.1:1 to 1.5:1 into the solution for the graft copolymerization at 45° C. to 75° C. for 0.5 hours to 5 hours to obtain products; and obtaining the grafted carboxymethyl cellulose by using ethanol or acetone as a precipitant to precipitate and separate the products.

In an embodiment, the hydroxyethyl cellulose modified scale inhibitor is a grafted carboxymethyl cellulose obtained by a preparation method including: dissolving the hydroxyethyl cellulose in water to prepare a solution with a mass percentage concentration of 10% of the hydroxyethyl cellulose; adding the ammonium persulfate with a mole number being 5% of a mole number of the hydroxyethyl cellulose into the solution as the initiator; adding the N-(3-dimethylaminopropyl) methyl acrylamide with a mass ratio to the hydroxyethyl cellulose being 1:1 into the solution for the graft copolymerization at 70° C. for 3 hours to obtain products; and obtaining the grafted carboxymethyl cellulose by using acetone as a precipitant to precipitate and separate the products.

A hydroxyethyl cellulose modified scale inhibitor for green and efficient inhibiting silica scale, which is obtained by a graft copolymerization with hydroxyethyl cellulose as a raw material, ammonium persulfate as an initiator and N-(3-dimethylaminopropyl) methyl acrylamide as a graft monomer, a schematic diagram of the preparation method of the hydroxyethyl cellulose modified scale inhibitor is shown as FIG. 1.

The preparation method includes: dissolving the hydroxyethyl cellulose in water to prepare a solution with a mass percentage concentration of 1% to 10% of the hydroxyethyl cellulose; adding the ammonium persulfate with a mole number being 1% to 5% of a mole number of the hydroxyethyl cellulose into the solution as the initiator; adding the N-(3-dimethylaminopropyl) methyl acrylamide with a mass ratio to the hydroxyethyl cellulose being 0.1:1 to 1.5:1 into the solution for the graft copolymerization at 45° C. to 75° C. for 0.5 hours to 5 hours to obtain products; and obtaining the grafted carboxymethyl cellulose by using ethanol or acetone as a precipitant to precipitate and separate the products.

The modified hydroxyethyl cellulose scale inhibitor material for green and efficient inhibiting the silica scale prepared by the preparation method of the disclosure has both the dispersing effect of hydroxyethyl cellulose and the stabilizing effect of amino group on the silicon dioxide in water. It not only prevents silicon dioxide from polymerizing to form scale, but also reduces the size of silicon dioxide scale, which is conducive to its application in reverse osmosis system. In addition, because cellulose is a natural biodegradable material, it has the characteristics of non-toxic and no secondary pollution.

The preparation method of the modified hydroxyethyl cellulose scale inhibitor for green and efficient inhibiting the silica scale has the advantages of simple operation and short synthesis time. The main raw material used in the preparation method is natural polymer products with rich sources, which is low-cost and suitable for large-scale industrial production. The preparation method is an economic preparation method to obtain high-quality water treatment agent.

The disclosure has beneficial effects as follows.

(1) The modified hydroxyethyl cellulose scale inhibitor for green and efficient inhibiting the silica scale has good solubility, can prevent the formation of silica scale body from being too large, and is beneficial to eliminate the problem of deposition on the membrane surface caused by the increase of the size of the stabilizer formed by the scale inhibitor and the scaling ions.

(2) High molecular materials come from a wide range of sources and are cheap, and the modified hydroxyethyl cellulose scale inhibitor has a high ratio of performance to price.

(3) The main chain of cellulose is biodegradable and has no toxicity, so it will not cause secondary pollution to water.

(4) After using the hydroxyethyl cellulose scale inhibitor of the disclosure, the solubility of the remaining silicon dioxide within 12 hours can be increased to 350 mg·L$^{-1}$.

(5) The modified hydroxyethyl cellulose scale inhibitor material prepared in embodiment 1, the content of N-(3-dimethylaminopropyl) methyl acrylamide is 43% according to mass fraction, which can achieve 79% scale inhibition efficiency. Compared with other embodiments, it has the best scale inhibition effect on silicon dioxide.

DETAILED DESCRIPTION OF EMBODIMENTS

The disclosure is further described below through embodiments. It should be understood that these embodiments are explanations and examples of the disclosure and do not limit the scope of the disclosure in any form.

Embodiment 1

Figure 1:
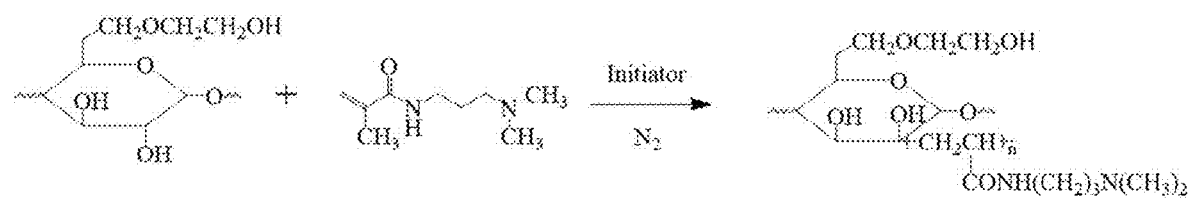
FIG. 1 illustrates a schematic diagram of a synthesis of a modified hydroxyethyl cellulose scale inhibitor.
Figure 2:
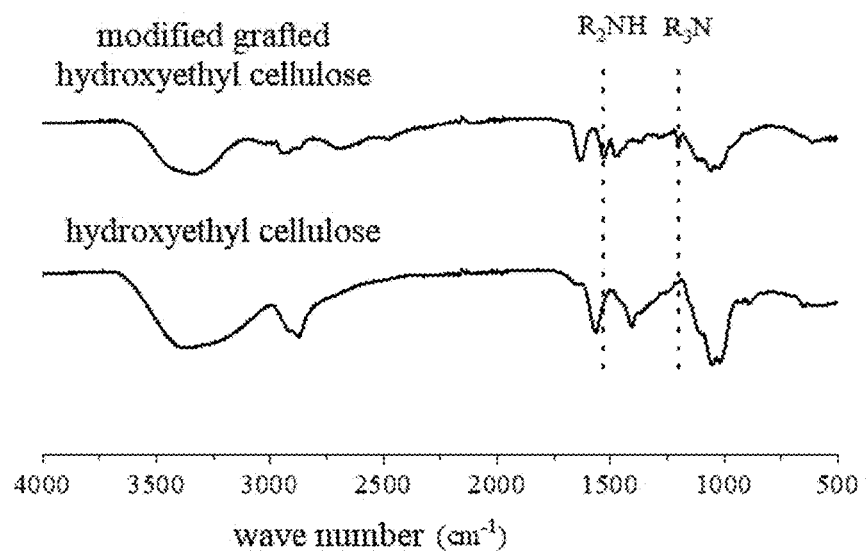
FIG. 2 illustrates Fourier-transform infrared spectra of hydroxyethyl cellulose and a modified hydroxyethyl cellulose scale inhibitor.
Figure 3:
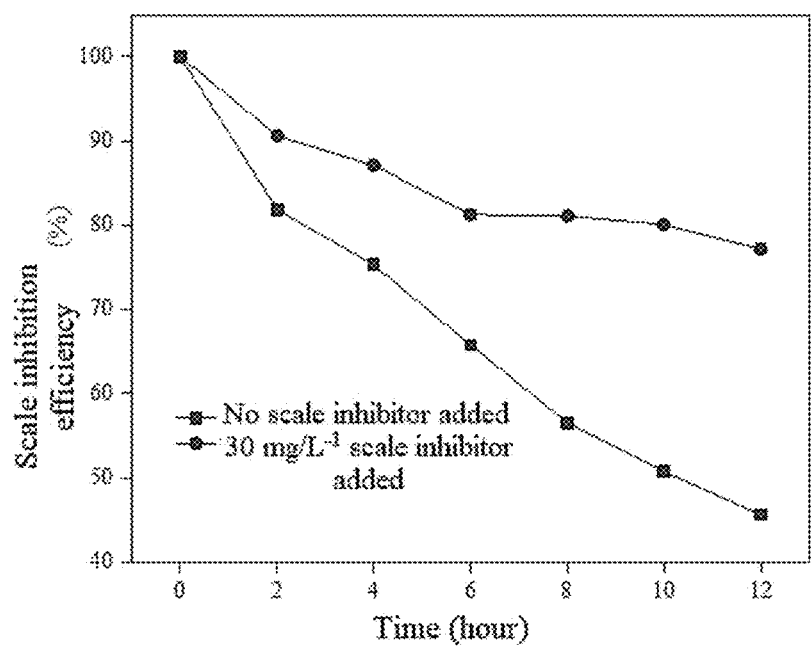
FIG. 3 illustrates the scale inhibition efficiency of a modified hydroxyethyl cellulose scale inhibitor in a static scale inhibition experiment.
Figure 4:
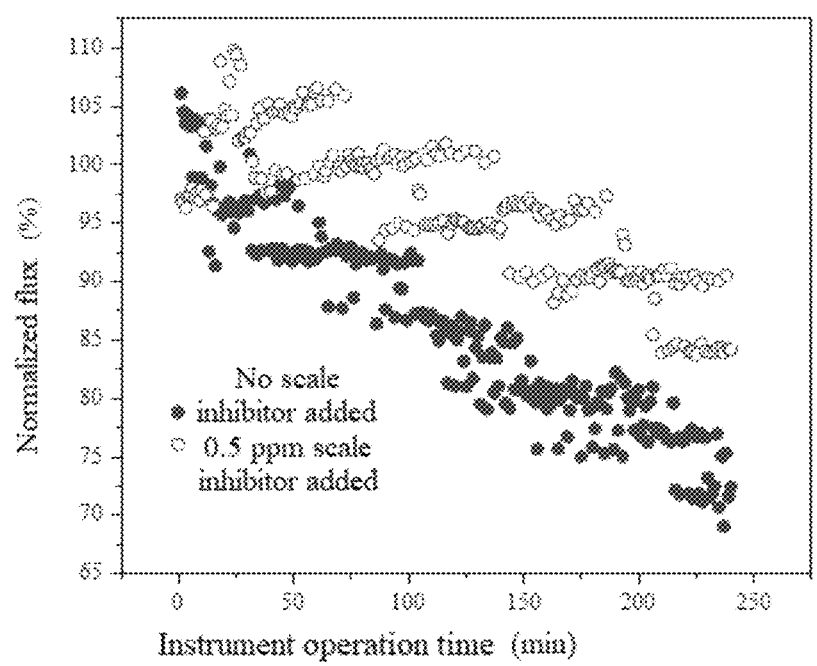
FIG. 4 illustrates the comparison of the reverse osmosis membrane flux with and without adding a modified hydroxyethyl cellulose scale inhibitor.

Dissolving hydroxyethyl cellulose (a viscosity of the hydroxyethyl cellulose is 80 milli-pascal seconds (mPa·s) to 125 mPa·s) in pure water to prepare a solution with a mass percentage concentration of 10% hydroxyethyl cellulose, stirring under nitrogen atmosphere to make the solution evenly, then adding ammonium persulfate into the solution as an initiator (the addition amount of the ammonium persulfate is 5% of a mole number of the hydroxyethyl cellulose), then adding N-(3-dimethylaminopropyl) methyl acrylamide (the mass ratio of the N-(3-dimethylaminopropyl) methyl acrylamide to the hydroxyethyl cellulose is 1:1) after pH adjustment into the solution for reacting at 70° C. for 3 hours to obtain products, and then preparing a modified hydroxyethyl cellulose scale inhibitor material by using acetone as a precipitant to precipitate and separate the products and drying. A content of the N-(3-dimethylaminopropyl) methyl acrylamide is 43% according to mass fraction, and the degree of substitution n is 1.0. As illustrated in FIG. 2, which illustrates Fourier-transform infrared spectra of the hydroxyethyl cellulose and the modified hydroxyethyl cellulose scale inhibitor material. It can be seen from FIG. 2 that in the Fourier-transform infrared spectroscopy of the modified hydroxyethyl cellulose scale inhibitor material, 1530 cm$^{-1}$ is a N—H characteristic absorption peak on an amide group, which is proved that the modified hydroxyethyl cellulose scale inhibitor material is successfully prepared. FIG. 3 illustrates a scale inhibition efficiency of a modified hydroxyethyl cellulose scale inhibitor in a static scale inhibition experiment. It can be seen from FIG. 3 that for supersaturated silicon dioxide solution (the concentration is recorded as 500 mg·L$^{-1}$ in silicon dioxide), the scale inhibition efficiency of silicon dioxide is obtained by determining the content of reactive silicon dioxide by spectrophotometry. When a dosage of the scale inhibitor is 30 mg·L$^{-1}$, a residual concentration of the silicon dioxide after 12 hours is 395 mg·L$^{-1}$, while the residual concentration of reactive silicon dioxide without the scale inhibitor is 225 mg·L$^{-1}$, achieving 79% scale inhibition efficiency. The scale inhibition performance of the scale inhibitor in the reverse osmosis system is evaluated by a cross-flow high-pressure flat membrane instrument. The quality of the permeate is automatically recorded according to a balance to calculate the permeation flux. It can be seen from FIG. 4 that the addition of the scale inhibitor increases the normalized flux of commercial reverse osmosis membrane from 73% to more than 80% after 4 hours.

The structural formula of the modified hydroxyethyl cellulose scale inhibitor material is shown as following Chemical Formula I:

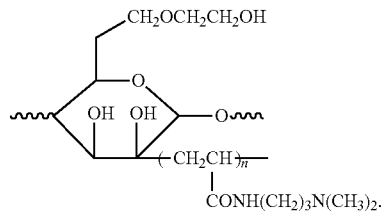

(Chemical Formula I)

Embodiment 2

Dissolving hydroxyethyl cellulose (a viscosity of the hydroxyethyl cellulose is 250 mPa·s to 450 mPa·s) in pure water to prepare a solution with a mass percentage concentration of 1% hydroxyethyl cellulose, stirring under nitrogen atmosphere to make the solution evenly, then adding ammonium persulfate into the solution as an initiator (the addition amount of the ammonium persulfate is 1% of a mole number of the hydroxyethyl cellulose), then adding N-(3-dimethylaminopropyl) methyl acrylamide (the mass ratio of the N-(3-dimethylaminopropyl) methyl acrylamide to the hydroxyethyl cellulose is 0.3:1) after pH adjustment into the solution for reacting at 50° C. for 1 hour to obtain products, and then preparing a modified hydroxyethyl cellulose scale inhibitor material by using acetone as a precipitant to precipitate and separate the products and drying. A content of the N-(3-dimethylaminopropyl) methyl acrylamide is 17% according to mass fraction, and the degree of substitution n is 0.26. In a static scale inhibition experiment, for supersaturated silicon dioxide solution (the concentration is recorded as 500 mg·L$^{-1}$ in silicon dioxide), the scale inhibition efficiency of silicon dioxide is obtained by determining the content of reactive silicon dioxide by spectrophotometry. When a dosage of the scale inhibitor is 80 mg·L$^{-1}$, a residual concentration of the silicon dioxide after 12 hours is 360 mg·L$^{-1}$, while the residual concentration of reactive silicon dioxide without the scale inhibitor is 225 mg·L$^{-1}$, achieving 72% scale inhibition efficiency. The scale inhibition performance of the scale inhibitor in the reverse osmosis system is evaluated by a cross-flow high-pressure flat membrane instrument, the quality of the permeate is automatically recorded according to a balance to calculate the permeation flux, and the addition of the scale inhibitor increases the normalized flux of commercial reverse osmosis membrane from 73% to more than 80% after 4 hours.

Embodiment 3

Dissolving hydroxyethyl cellulose (a viscosity of the hydroxyethyl cellulose is 100 mPa·s to 200 mPa·s) in pure water to prepare a solution with a mass percentage concentration of 7% hydroxyethyl cellulose, stirring under nitrogen atmosphere to make the solution evenly, then adding ammonium persulfate into the solution as an initiator (the addition amount of the ammonium persulfate is 4% of a mole number of the hydroxyethyl cellulose), then adding N-(3-dimethylaminopropyl) methyl acrylamide (the mass ratio of the N-(3-dimethylaminopropyl) methyl acrylamide to the hydroxyethyl cellulose is 0.1:1) after pH adjustment into the solution for reacting at 65° C. for 5 hours to obtain products, and then preparing a modified hydroxyethyl cellulose scale inhibitor material by using acetone as a precipitant to precipitate and separate the products and drying. A content of the N-(3-dimethylaminopropyl) methyl acrylamide is 8% according to mass fraction, and the degree of substitution n is 11. In a static scale inhibition experiment, for supersaturated silicon dioxide solution (the concentration is recorded as 500 mg·L$^{-1}$ in silicon dioxide), the scale inhibition efficiency of silicon dioxide is obtained by determining the content of unpolymerized silicon dioxide by spectrophotometry. When a dosage of the scale inhibitor is 200 mg·L$^{-1}$, a residual concentration of the silicon dioxide after 12 hours is 350 mg·L$^{-1}$, while the residual concentration of reactive silicon dioxide without the scale inhibitor is 225 mg·L$^{-1}$, achieving 70% scale inhibition efficiency. The scale inhibition performance of the scale inhibitor in the reverse osmosis system is evaluated by a cross-flow high-pressure flat membrane instrument, the quality of the permeate is automatically recorded according to a balance to calculate the permeation flux, and the addition of the scale inhibitor increases the normalized flux of commercial reverse osmosis membrane from 73% to more than 80% after 4 hours.

Embodiment 4

Dissolving hydroxyethyl cellulose (a viscosity of the hydroxyethyl cellulose is 1000 mPa·s to 1500 mPa·s) in pure water to prepare a solution with a mass percentage concentration of 2% hydroxyethyl cellulose, stirring under nitrogen atmosphere to make the solution evenly, then adding ammonium persulfate into the solution as an initiator (the addition amount of the ammonium persulfate is 2% of a mole number of the hydroxyethyl cellulose), then adding N-(3-dimethylaminopropyl) methyl acrylamide (the mass ratio of the N-(3-dimethylaminopropyl) methyl acrylamide to the hydroxyethyl cellulose is 1.5:1) after pH adjustment into the solution for reacting at 75° C. for 0.5 hours to obtain products, and then preparing a modified hydroxyethyl cellulose scale inhibitor material by using acetone as a precipitant to precipitate and separate the products and drying. A content of the N-(3-dimethylaminopropyl) methyl acrylamide is 57% according to mass fraction, and the degree of substitution n is 1.72. In a static scale inhibition experiment, for supersaturated silicon dioxide solution (the concentration is recorded as 500 mg·L$^{-1}$ in silicon dioxide), the scale inhibition efficiency of silicon dioxide is obtained by determining the content of unpolymerized silicon dioxide by spectrophotometry. When a dosage of the scale inhibitor is 20 mg·L$^{-1}$, a residual concentration of the silicon dioxide after 12 hours is 385 mg·L$^{-1}$, while the residual concentration of reactive silicon dioxide without the scale inhibitor is 225 mg·L$^{-1}$, achieving 77% scale inhibition efficiency. The scale inhibition performance of the scale inhibitor in the reverse osmosis system is evaluated by a cross-flow high-pressure flat membrane instrument, the quality of the permeate is automatically recorded according to a balance to calculate the permeation flux, and the addition of the scale inhibitor increases the normalized flux of commercial reverse osmosis membrane from 73% to more than 80% after 4 hours.

Embodiment 5

Dissolving hydroxyethyl cellulose (a viscosity of the hydroxyethyl cellulose is 5000 mPa·s to 6400 mPa·s) in pure water to prepare a solution with a mass percentage concentration of 5% hydroxyethyl cellulose, stirring under nitrogen atmosphere to make the solution evenly, then adding ammonium persulfate into the solution as an initiator (the addition amount of the ammonium persulfate is 3% of a mole number of the hydroxyethyl cellulose), then adding N-(3-dimethylaminopropyl) methyl acrylamide (the mass ratio of the N-(3-dimethylaminopropyl) methyl acrylamide to the hydroxyethyl cellulose is 0.6:1) after pH adjustment into the solution for reacting at 55° C. for 2 hours to obtain products, and then preparing a modified hydroxyethyl cellulose scale inhibitor material by using acetone as a precipitant to precipitate and separate the products and drying. A content of the N-(3-dimethylaminopropyl) methyl acrylamide is 28% according to mass fraction, and the degree of substitution n is 0.55. In a static scale inhibition experiment, for supersaturated silicon dioxide solution (the concentration is recorded as 500 mg·L$^{-1}$ in silicon dioxide), the scale inhibition efficiency of silicon dioxide is obtained by determining the content of unpolymerized silicon dioxide by spectrophotometry. When a dosage of the scale inhibitor is 40 mg·L$^{-1}$, a residual concentration of the silicon dioxide after 12 hours is 375 mg·L$^{-1}$, while the residual concentration of reactive silicon dioxide without the scale inhibitor is 225 mg·L$^{-1}$, achieving 75% scale inhibition efficiency. The scale inhibition performance of the scale inhibitor in the reverse osmosis system is evaluated by a cross-flow high-pressure flat membrane instrument, the quality of the permeate is automatically recorded according to a balance to calculate the permeation flux, and the addition of the scale inhibitor increases the normalized flux of commercial reverse osmosis membrane from 73% to more than 80% after 4 hours.

Comparative Embodiment 1

The commercially available hydroxyethyl cellulose is selected as the comparison, in a static scale inhibition experiment, for supersaturated silicon dioxide solution (the concentration is recorded as 500 mg·L$^{-1}$ in silicon dioxide), the scale inhibition efficiency of silicon dioxide is obtained by determining the content of reactive silicon dioxide by spectrophotometry. When a dosage of the scale inhibitor is 160 mg·L$^{-1}$, a residual concentration of the silicon dioxide after 12 hours is 255 mg·L$^{-1}$, while the residual concentration of reactive silicon dioxide without the scale inhibitor is 225 mg·L$^{-1}$, compared with the grafted hydroxyethyl cellulose, it has low scale inhibition efficiency, poor polymerization inhibition effect on silicon dioxide, and no obvious scale inhibition effect on silicon dioxide.

Comparative Embodiment 2

Dissolving hydroxyethyl cellulose (a viscosity of the hydroxyethyl cellulose is 100 mPa·s to 200 mPa·s) in pure water to prepare a solution with a mass percentage concentration of 7% hydroxyethyl cellulose, stirring under nitrogen atmosphere to make the solution evenly, then adding ammonium persulfate into the solution as an initiator (the addition amount of the ammonium persulfate is 4% of a mole number of the hydroxyethyl cellulose), then adding 3-chloropropylamine (the mass ratio of the 3-chloropropylamine to the hydroxyethyl cellulose is 1:1) after pH adjustment into the solution for reacting at 65° C. for 3 hours to obtain products, and then preparing a modified hydroxyethyl cellulose scale inhibitor material by using ethanol as a precipitant to precipitate and separate the products and drying. In a static scale inhibition experiment, for supersaturated silicon dioxide solution (the concentration is recorded as 500 mg·L$^{-1}$ in silicon dioxide), the scale inhibition efficiency of silicon dioxide is obtained by determining the content of unpolymerized silicon dioxide by spectrophotometry. When a dosage of the scale inhibitor is 50 mg·L$^{-1}$, a residual concentration of the silicon dioxide after 12 hours is 200 mg·L$^{-1}$, while the residual concentration of unpolymerized silicon dioxide without the scale inhibitor is 225 mg·L$^{-1}$, compared with the selected grafted monomer n-(3-dimethylaminopropyl) methyl acrylamide, the grafted 3-chloropropylamine has a negative effect, and the residual content of silicon dioxide after use is lower than that without adding chemicals.

What is claimed is:

1. A method for inhibiting silica scale, comprising: adding a modified hydroxyethyl cellulose scale inhibitor to water in one of a cooling water and a reverse osmosis system in a range of 5 mg·L$^{-1}$ to 500 mg·L$^{-1}$;
wherein the modified hydroxyethyl cellulose scale inhibitor is obtained by graft copolymerization of hydroxyethyl cellulose in nitrogen atmosphere, and a structural formula of the modified hydroxyethyl cellulose scale inhibitor is shown as following Chemical Formula I:

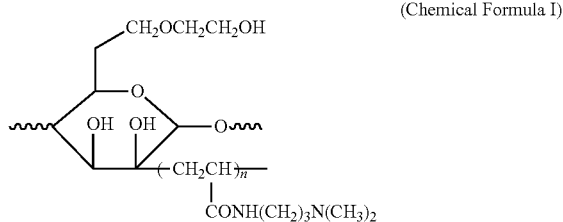

(Chemical Formula I)

where n is in a range of 0.04 to 2.00;
wherein the modified hydroxyethyl cellulose scale inhibitor is a grafted hydroxyethyl cellulose obtained by a reaction of the hydroxyethyl cellulose and N-(3-dimethylaminopropyl) methyl acrylamide.

2. The method for inhibiting silica scale according to claim 1, wherein the hydroxyethyl cellulose modified scale inhibitor is obtained by the graft copolymerization with the hydroxyethyl cellulose as a raw material, ammonium persulfate as an initiator and the N-(3-dimethylaminopropyl) methyl acrylamide as a graft monomer according to following Reaction Formula I:

(Reaction Formula I).

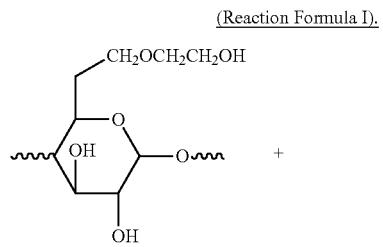 +

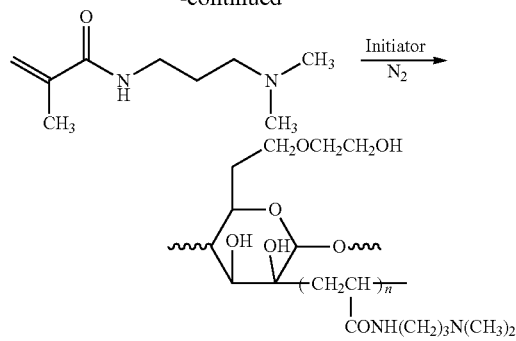

3. The method for inhibiting silica scale according to claim 2, wherein the hydroxyethyl cellulose modified scale inhibitor is a grafted carboxymethyl cellulose obtained by a preparation method including:
dissolving the hydroxyethyl cellulose in water to prepare a solution with a mass percentage concentration of 1% to 10% of the hydroxyethyl cellulose;
adding the ammonium persulfate with a mole number being 1% to 5% of a mole number of the hydroxyethyl cellulose into the solution as the initiator;
adding the N-(3-dimethylaminopropyl) methyl acrylamide with a mass ratio to the hydroxyethyl cellulose being 0.1:1 to 1.5:1 into the solution for the graft copolymerization at 45° C. to 75° C. for 0.5 hours to 5 hours to obtain products; and
obtaining the grafted carboxymethyl cellulose by using one of ethanol and acetone as a precipitant to precipitate and separate the products;
wherein the mole number is an amount of substance.

4. The method for inhibiting silica scale according to claim 2, wherein the hydroxyethyl cellulose modified scale inhibitor is a grafted carboxymethyl cellulose obtained by a preparation method including:
dissolving the hydroxyethyl cellulose in water to prepare a solution with a mass percentage concentration of 10% of the hydroxyethyl cellulose;
adding the ammonium persulfate with a mole number being 5% of a mole number of the hydroxyethyl cellulose into the solution as the initiator;
adding the n-(3-dimethylaminopropyl) methyl acrylamide with a mass ratio to the hydroxyethyl cellulose being 1:1 into the solution for the graft copolymerization at 70° C. for 3 hours to obtain products; and
obtaining the grafted carboxymethyl cellulose by using acetone as a precipitant to precipitate and separate the products;
wherein the mole number is an amount of substance.

* * * * *